Figure 1:
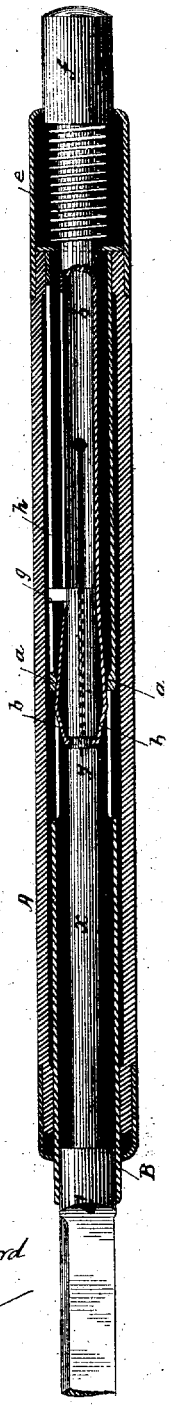

C. W. BOMAN,

Assignor to J. RECKENDORFER.

HOLDER FOR KNIFE BLADES.

No. 10,335. Reissued June 5, 1883.

Witnesses.
Walter Blandford
Levi Bacon

Inventor.
Claes W. Boman
by Marcellus Bailey
his attorney

UNITED STATES PATENT OFFICE.

CLAES W. BOMAN, OF NEW YORK, N. Y., ASSIGNOR TO JOSEPH RECKENDORFER, OF SAME PLACE.

HOLDER FOR KNIFE-BLADES.

SPECIFICATION forming part of Reissued Letters Patent No. 10,335, dated June 5, 1883.

Original No. 273,222, dated February 27, 1883. Application for reissue filed April 11, 1883.

*To all whom it may concern:*

Be it known that I, CLAES W. BOMAN, of the city, county, and State of New York, have invented certain new and useful Improvements in Knives and Similar Articles, of which the following is a specification.

My invention relates to that class of knives and analogous articles in which a sliding blade or its equivalent, capable of freely moving back and forth in a case or handle within certain limits, so that it will drop by gravity in one direction or the other, according to which end of the case is held uppermost, is combined with a spring locking device adapted to lock the instrument in its advanced or retracted position.

For the purpose of disengaging the locking mechanism from the blade, it has been usual to make use of a depressible knob, button, or its equivalent, which, when depressed, acts to release the blade. Heretofore this knob or its equivalent has been placed on the side of the case or handle, and the consequence is, that when the handle is grasped in the hand there is liability, when the knife is in use, that the knob or button which projects laterally from the handle will be pressed by the hand, with the effect of releasing the blade. Furthermore, the knob or button, when thus arranged, renders the knife awkward to handle, and forms a lateral projection which is apt to catch in the pocket.

In order to remedy these and other objections, and to obtain a knife of this kind which is more convenient to carry and use, I have combined with the handle and locking device and shank of the knife or similar article, and with the device for limiting the motion of the shank, a pressure-cap, which is placed at the rear end and on the prolongation of the knife-handle, is longitudinally movable, and is combined or provided with a retracting-spring, which moves the cap in a direction opposite to that in which it is pressed by hand. The cap is connected with the locking mechanism in such manner that when pushed forward by hand against the stress of the retracting-spring it will act to move the locking mechanism in a direction to release the blade. When hand-pressure is removed from it, the retracting-spring returns it at once to its normal position, and the locking mechanism is in condition to automatically engage the blade at the proper point. By "retracting-spring" I intend the spring which returns the pressure-cap to the position from which it is moved by hand. The locking mechanism should of course be spring-controlled, so as to automatically engage the blade, and the same spring which controls the pressure-cap can, if desired, be used to control the locking mechanism. The construction and arrangement of the locking mechanism can obviously be widely varied, and I do not restrict myself to any special form of such mechanism. In illustration of my invention I have shown in the accompanying drawings locking mechanism analogous to the lead-grasping mechanism of an "automatic" pencil; but in lieu of that mechanism other blade-locking devices can be combined with and operated by the spring-controlled pressure-cap.

I have hereinbefore stated that the invention is applicable to knives and analogous or similar articles. I include under this head tooth-picks, button-hooks, and other flat articles which can be arranged in small compass like a knife-blade.

Figure 2:
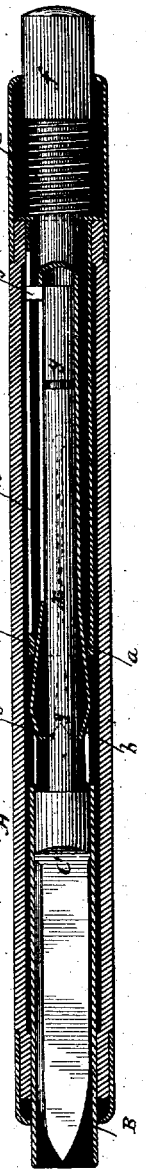

In the drawings, Figure 1 is a longitudinal central section of an instrument embodying my invention, the parts being represented in the position they assume when the knife-blade protrudes. Fig. 2 is a like section of the same with the blade retracted within the case or handle. In this figure the pressure-cap is shown pushed forward far enough to permit the jaws to open.

A is the external tubular case or handle, of any suitable configuration and material. Within it is fastened the metallic tube B, which virtually forms part of the handle or case, and constitutes also a support for the cylindrical portion of the shank or tang of the blade C adapted to slide freely back and forth therein. The rear portion of the shank is a comparatively slender stem, *a*, which extends rearwardly between jaws *b*, which are capable of sliding lengthwise in the tube B. The jaws, which are provided with external swells or inclines, like the jaws of an automatic lead and crayon holder, have a spring action and normally stand apart. They are forced together, so as to grasp the stem *x*, by being drawn back against the part *a* of the tube B, which is formed by cutting away the tube on opposite sides at that point, and then bending inwardly the metal at the rear edges of the openings thus formed, which produces a contracted tip or nozzle similar in function to the tip or nozzle of an automatic pencil. The jaws are normally held in a closed condition by means of a spiral retracting-spring, *e*, which is confined between the end of the tube B and a pressure-cap, *f*, fastened on the rearwardly-projecting end of the jaws, which pressure-cap projects far enough beyond the rear of case A to allow it to be pushed inwardly by hand sufficiently to release the jaws when it is desired to loose their grasp on the stem *x* of the knife-blade. In the stem *x* are cut peripheral notches *y y* at the points where the jaws meet it at the two extremes of its movement, these notches being made for the purpose of permitting the jaws to engage the stem, and thus lock it in position, either when the blade projects, as shown in Fig. 1, or is retracted, as shown in Fig. 2. For the purpose of limiting the range of movement of the blade, the stem *x*, at its rear, is provided with a pin or finger, *g*, which projects through the space between the stems of the jaws *b* into a longitudinal slot, *h*, of the proper length, formed in the tube B. The real use of the pin or finger is to prevent the blade from dropping entirely out of the handle.

The operation is as follows: Suppose the blade to be retracted, and it be desired to project it from the case. The device is held point downward and the pressure-cap is pushed in. The jaws are thus caused to loose their hold on the stem *x*, and the released knife falls by its gravity until the finger *g* brings up against the front end of slot *h*. In this position the rear notch, *y*, in the stem will, when pressure is removed from the cap *f*, be entered by the jaws *b*, and the knife will then be locked in its advanced position. To retract the blade the same operation is gone through with, holding the point of the instrument uppermost. Where the tube B projects beyond the jaws, as shown in the drawings, and the shank or tang of the tool is enlarged, so as to fit the bore of same, then the knife or other instrument is held, when exposed or in its advanced position, outside of or beyond the jaws, and is more firmly supported than if the tube were not so extended.

In this instrument it will be noticed that the following features are combined:

First. The blade, when released, is free to drop by gravity in one direction or the other, within prescribed limits, in the handle.

Second. The device for releasing the blade is on the rear end of the handle, and has a longitudinal instead of lateral movement. It is thus out of the way, and even if pressed by the hand in grasping the handle it cannot be moved by this pressure, since the pressure is from the side instead of from the end.

Third. The releasing device thus placed at the rear of the handle is spring-controlled, so that it will automatically return to its original position when released from forward pressure. It thus permits the knife to be easily and conveniently handled with one hand only.

By "pressure-cap" I intend not only the special form of cap shown in the drawings, but any spring-controlled longitudinally-movable stem or prolongation of the handle arranged in the same position, and operating, when pressed forward against the stress of the spring, to effect the release of the blade or its equivalent.

Having now described my improvements, what I claim as new and of my invention is as follows:

1. In combination, the following elements: first, the case or handle; second, the knife or analogous article having a shank or tang; third, the spring-controlled locking mechanism; fourth, the spring-controlled longitudinally-movable pressure-cap; and, fifth, the device for preventing the tang and knife or analogous article from dropping out of the handle, these parts being constructed and operating substantially in the manner and for the purposes described.

2. In combination with a spring-controlled locking mechanism and a longitudinally-movable pressure-cap, a knife or analogous article having a tang, the device for preventing the article from dropping out of the handle, and a tube projecting beyond the locking device, in which a part of the tang fits and is supported, intending to claim none of these elements separately, but only the combination of all of them, substantially in the manner described.

In testimony whereof I have hereunto set my hand this 7th day of April, 1883.

CLAES W. BOMAN.

Witnesses:
LEOPOLD ANSBACHER,
ADOLPH SCHIFF.